United States Patent
Schmidt et al.

(10) Patent No.: US 9,525,458 B2
(45) Date of Patent: Dec. 20, 2016

(54) WIRELESS AUDIO TRANSMISSION SYSTEM, PARTICULARLY A WIRELESS MICROPHONE SYSTEM

(75) Inventors: Axel Schmidt, Wedemark (DE); Gerrit Buhe, Wedemark (DE); Andreas Wilzeck, Gehrden (DE); Qipeng Cai, Hannover (DE); Maria Dolores Pérez-Guirao, Hannover (DE); Christoph König, Hannover (DE); Hanwen Cao, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 529 days.

(21) Appl. No.: 13/498,672

(22) PCT Filed: Sep. 23, 2010

(86) PCT No.: PCT/EP2010/064078
§ 371 (c)(1),
(2), (4) Date: May 21, 2012

(87) PCT Pub. No.: WO2011/036223
PCT Pub. Date: Mar. 31, 2011

(65) Prior Publication Data
US 2012/0224713 A1 Sep. 6, 2012

(30) Foreign Application Priority Data
Sep. 28, 2009 (DE) .................. 10 2009 043 007

(51) Int. Cl.
H04B 1/76 (2006.01)
(52) U.S. Cl.
CPC ............. *H04B 1/76* (2013.01); *H04R 2420/07* (2013.01)
(58) Field of Classification Search
CPC ........ H04R 20/07; H04R 2420/07; H04B 1/76
(Continued)

(56) References Cited

U.S. PATENT DOCUMENTS 6,522,352 B1* 2/2003 Strandwitz ......... H04N 1/00281
348/211.2
8,432,978 B2* 4/2013 Han et al. .................. 375/260
(Continued)

FOREIGN PATENT DOCUMENTS

EP 1 406 224 4/2004
WO WO 2009/035250 3/2009

OTHER PUBLICATIONS

Wu Yu-Chun et al.: "Protection of Wireless Microphones in IEEE 802.22 Cognitive Radio Network", Communications Workshops, 2009. ICC Workshops 2009. IEEE International Conference on, IEEE, Piscataway, NJ, USA, Jun. 14, 2009, Seiten 1-5, XP031515496.

(Continued)

*Primary Examiner* — Sonia Gay
(74) *Attorney, Agent, or Firm* — Frommer Lawrence & Haug LLP

(57) ABSTRACT

There is provided a wireless audio transmission system, in particular a wireless microphone system, for wireless audio transmission. The system has at least one wireless microphone unit for detecting audio signals and for wirelessly transmitting the detected audio signals, and a central unit. The central unit has a wireless receiving unit for receiving the wirelessly transmitted audio signals from the wireless microphone units, a pilot tone transmitting unit for transmitting a first pilot tone on a pilot channel, and a pilot tone receiving unit for receiving and processing a second pilot tone signal. The pilot tone signal has information in respect of the wireless transmission between the microphone units and the central unit.

8 Claims, 1 Drawing Sheet

(58) Field of Classification Search
USPC .......................................................... 381/77
See application file for complete search history.

(56) References Cited

U.S. PATENT DOCUMENTS

| | | | | |
|---|---|---|---|---|
| 2002/0042282 | A1* | 4/2002 | Haupt | G08C 17/02 |
| | | | | 455/509 |
| 2007/0037606 | A1* | 2/2007 | Ganley et al. | 455/569.1 |
| 2007/0104176 | A1* | 5/2007 | Ji | H04W 72/0406 |
| | | | | 370/348 |
| 2007/0232245 | A1* | 10/2007 | Cheng | H04R 5/02 |
| | | | | 455/93 |
| 2008/0070632 | A1* | 3/2008 | Obuchi | H04W 74/0866 |
| | | | | 455/561 |
| 2010/0081487 | A1* | 4/2010 | Chen | G10L 21/0208 |
| | | | | 455/575.1 |
| 2010/0112939 | A1* | 5/2010 | Chang et al. | 455/26.1 |
| 2010/0189273 | A1* | 7/2010 | Statham et al. | 381/58 |
| 2010/0284424 | A1* | 11/2010 | Eitan | 370/470 |

OTHER PUBLICATIONS

International Search Report for Application No. PCT/EP2010/064078 dated Feb. 3, 2011.

* cited by examiner

WIRELESS AUDIO TRANSMISSION SYSTEM, PARTICULARLY A WIRELESS MICROPHONE SYSTEM

The present application claims priority from PCT Patent Application No. PCT/EP2010/064078 filed on Sep. 23, 2010, which claims priority from German Patent Application No. DE 10 2009 043 007.5 filed on Sep. 28, 2009, the disclosures of which are incorporated herein by reference in their entirety.

BACKGROUND OF THE INVENTION

1. Field of the Invention

The present invention concerns a wireless audio transmission system and in particular a wireless microphone system.

2. Description of Related Art

Analog wireless microphone systems are known, in which a search is made for free frequency channels for transmission of the audio signals detected by the microphone units. If a channel is suffering from interference the transmission suffers interference and a fresh channel without interference has to be used and the audio transmission can then be effected by way of that fresh channel.

In so-called program making special events PMSE applications there are typically wireless audio transmission paths which require frequency coordination. Those program making special events PMSE applications can represent for example wireless microphone systems having a central unit and a plurality of microphones, wherein the microphones communicate the detected audio signals to the central unit by way of a unidirectional wireless transmission path. The central unit serves as a receiver for all wireless transmission paths from the microphones. The microphones arc implemented in the form of transmitters and wirelessly transmit the detected audio signals to the central unit. In that case the microphones can transmit on a plurality of frequencies. In addition to the wireless microphone units however there may be further wirelessly transmitting units, for example temporary services white space devices WSD in the wireless communication environment. If those units transmit on the same frequencies as the wireless microphones that can involve problems in transmission. It is therefore necessary to provide for dynamic frequency occupancy and frequency allocation, coordination of the frequency occupancy and identification of the frequency occupancy in comparison with competing systems with the same or foreign radio standards.

SUMMARY OF THE INVENTION

Therefore an object of the present invention is to provide an improved wireless audio transmission system which can be reliably operated even in an environment suffering from interference sources.

Thus there is provided a wireless audio transmission system, in particular a wireless microphone system, for wireless audio transmission. The system has at least one wireless microphone unit for detecting audio signals and for wirelessly transmitting the detected audio signals, and a central unit. The central unit has a wireless receiving unit for receiving the wirelessly transmitted audio signals from the wireless microphone units, a pilot tone transmitting unit for transmitting a first pilot tone on a pilot channel, and a pilot tone receiving unit for receiving and processing a second pilot tone signal. The pilot tone signal has information in respect of the wireless transmission between the microphone units and the central unit.

In an aspect of the invention the power of the first/second pilot tone signal on the pilot channel is higher than the power of the wireless audio transmission between the microphone units and the central unit. In that way the pilot tone signal can have a greater range and a higher power than the rest of the audio transmission.

In a further aspect of the invention transmission of the pilot tone signal is effected in time multiplex, frequency multiplex or code multiplex. That is advantageous as different microphone units can be connected by means of the pilot tone signal in a time slot, a frequency slot or a code slot.

In a further aspect of the invention the central unit is adapted upon being brought in operation to detect whether there is already a pilot channel. The central unit can access the pilot channel by means of the pilot tone receiving unit when one is present and can receive and process the information of the second pilot tone signal. The central unit is further adapted to produce a pilot tone signal by means of the pilot tone transmitting unit if hitherto there is not yet a pilot tone signal on a pilot tone channel.

The invention also concerns a wireless audio transmission system comprising at least one wireless transmission unit for wirelessly transmitting audio signals, and a central unit. The central unit comprises a wireless receiving unit for receiving the wirelessly transmitted audio signals from the wireless transmitting units, a pilot tone transmitting unit for transmitting a first pilot tone signal on the pilot channel and a pilot tone receiving unit for receiving and processing a second pilot tone signal. The pilot tone signal has information in respect of the wireless transmission between the transmitting units and the central unit.

The invention also concerns a wireless audio transmission method, in particular a method of wireless audio transmission in a microphone system. The system has a plurality of wireless microphone units and a central unit. Audio signals are detected and the detected audio signals are wirelessly transmitted. The wirelessly transmitted audio signals are received. A first pilot tone signal is transmitted on a pilot channel. A second pilot tone signal, if present, is received and processed. The pilot tone signal has information in respect of the wireless transmission between the microphone units and the central unit.

The invention concerns the idea of providing a wireless audio transmission system such as for example a wireless microphone system, the system having a central unit and a plurality of wireless audio transmission units like for example wireless microphones. The wireless microphones transmit detected audio signals wirelessly to the central unit. The central unit communicates a pilot signal by way of a pilot channel. The central unit can transmit a plurality of items of information by way of that pilot channel. Those items of information can be manufacturer metadata, operator metadata, frequency occupancy, a duration of occupancy and properties of its own system, frequency occupancy and properties of detected foreign systems, and control instructions such as for example a frequency allocation and/or a selection of operating modes for the specific system. In addition this can involve identification of the frequency occupancy of the system, its duration, and notification of the particular properties in relation to other systems. In addition distribution of items of frequency occupancy information of (foreign) systems can be effected to other central units by that pilot channel so as to permit cooperative sensing. Frequency allocation and control of the wireless transmission units such as for example the microphones can be effected within the transmission system by way of the pilot channel. The pilot channel can thus form a return channel from the central unit to the microphone units. Operating modes and parameters can be transmitted to the wireless transmission units through that pilot channel as a return channel from the central unit to the wireless transmitting units. The parameters can include for example a power control, adaptive modulation and adaptive encoding. In addition synchronization of various central units can also be effected by way of the pilot channel. A corresponding consideration applies to synchronization of the wireless audio transmission units (for example wireless microphones) to the central unit. The pilot channel can also be used for automatic dynamic or non-dynamic coordination of frequency occupancy, for example when various wireless transmission systems (for example microphone systems) are used. The pilot channel can further have items of information in respect of frequency occupancy of the wireless audio transmission systems. In that way external systems can easily detect frequency occupancy in the wireless audio transmission system.

Further configurations of the invention are subject-matter of the appendant claims.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
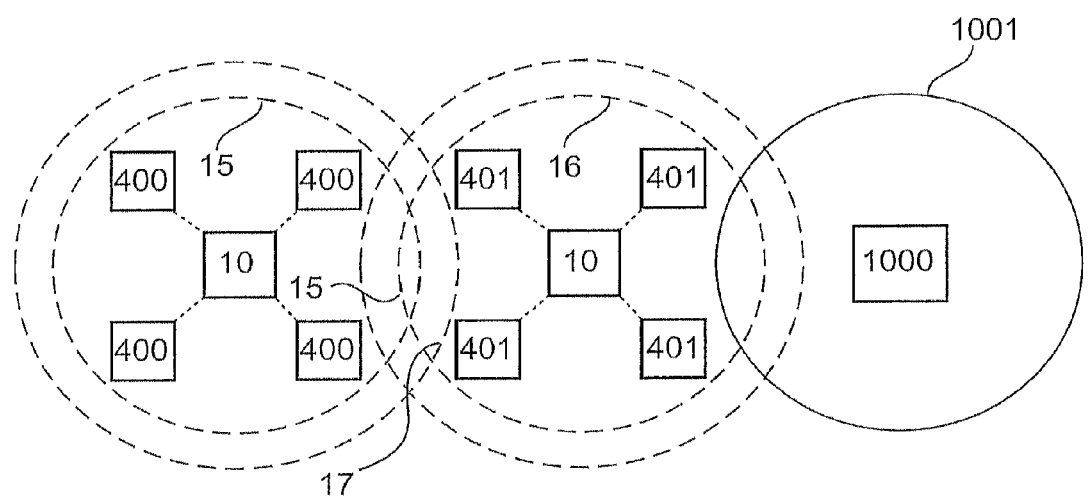
FIG. 1 shows a diagrammatic view of a wireless audio transmission system according to a first embodiment.

FIG. 1 shows a diagrammatic view of a wireless audio transmission system and in particular a wireless microphone system according to the first embodiment. The wireless microphone system has a first central unit 10 and a plurality of first wireless microphone units 400 as well as a second central unit 11 and a second plurality of wireless microphone units 401. The communication between the first central unit 10 and the first plurality of wireless microphone units 400 has a first range 15. The communication between the second central unit 11 and the second plurality of wireless microphone units 401 has a second range 16. The wireless microphone units detect or record audio signals and perform wireless audio transmission to the central unit 10. That can be effected for example by way of a wireless audio channel AK (for example an HF channel).

The first central unit sends a pilot signal by way of a pilot channel having a range 17. The second central unit 11 sends a pilot tone by way of the pilot channel having a range 17.

In the wireless communication or audio transmission environment having the first and second central units and the first and second pluralities of microphone units, there can also be a further wireless transmission unit 1000 (WSD) which can have a third range of 1001. The wireless transmission of the transmission unit 1000 can interfere with the communication between the first central unit 10 and the first plurality of wireless microphones 400 or the communication between the second central unit 11 and the wireless microphones 401.

The first central unit 10 is preferably adapted to scan a frequency band in respect of other services or wireless transmission units, upon activation of the central unit. In addition the first central unit looks in the frequency band available to it for a pilot channel in accordance with the first embodiment. If the first central unit 10 does not find a suitable pilot channel in the predetermined frequency band then the first central unit 10 produces its own pilot tone on a pilot channel. That pilot tone can have a plurality of items of information or can also be present in unmodeled relationship in the middle of a TV channel in order to mark it as occupied. Those items of information can comprise for example frequencies of the wireless audio transmission between the first plurality of microphone units and the first central unit. In addition they can have metadata of the manufacturer, metadata of the operator, frequency occupancy, duration of occupancy and properties of the system, frequency occupancy and properties of detected foreign systems and control instructions for the system.

The microphone units of the first multiplicity of microphone units receive the pilot tone on the pilot channel and can extract items of information from the pilot tone, which are intended for the respective microphone unit 400. Those items of information can contain for example the frequency allocation for the wireless audio transmission from the microphone units to the central unit.

When then the second central unit 11 is activated that central unit performs a frequency scanning operation for a pilot tone on a pilot channel. In that case the second central unit 11 should detect the pilot tone on the pilot channel of the first central unit and can also use that pilot channel.

In the above-described situation it can happen that the second central unit admittedly detects the pilot signal on the pilot channel, but not the wireless transmission paths between the first central unit 10 and the first multiplicity of microphone units 401. Alternatively the second central unit 11 can possibly detect the wireless transmission paths but not the pilot signal on the pilot channel. In that case the second central unit can extract items of information in respect of frequency occupancy of the wireless audio transmission between the first central unit and the audio transmission units. For the situation where the second central unit detects the wireless transmission paths but does not capture the pilot signal on the pilot channel, then the second central unit can admittedly detect a gappy frequency occupancy, but it is not capable of associating that audio transmission with the first central unit.

If however the second central unit does not detect the wireless transmission paths and does not capture the pilot signal on the pilot channel then the second central unit 11 produces an independent pilot signal.

The situation where admittedly the microphone paths but not the pilot signal on the pilot channel is detected can be prevented by the pilot signal being emitted at a higher power level than, the wireless audio transmission paths.

In addition the case where the second central unit detects neither the wireless transmission paths of the first central unit nor the pilot signal of the pilot channel of the first central unit is highly improbable.

It will be noted however that this can occur when the first and second central units are outside the respective range of the pilot signal on the pilot channel.

For the situation where the second central unit detects either the pilot signal of the pilot channel of the first central unit or the pilot signal and the wireless transmission paths of the first central unit then the second central unit can derive the presence of the first central unit and can take account of the items of information in the pilot signal such as for example frequency occupancy when selecting its own frequencies. The second central unit 11 can then fall back on the pilot channel and transmit a second pilot signal by way of that pilot channel. In that case the second pilot signal can be transmitted for example in time slots or frequency slots in the pilot channel.

As the second central unit can also transmit and receive the items of information by way of the pilot channel the first central unit can extract the additional items of information from the second central unit and use them for a further frequency occupancy. In addition as described hereinbefore information relating to foreign systems can also be transmitted in the pilot signal. As both the first and also the second central units 10, 11 are in a position to transmit, receive and extract the pilot tone on the pilot channel, the two central units can profit from additional items of information transmitted from one of the central units by way of the pilot channel. Based on those items of information frequency selection of the central units can be processed or controlled.

Optionally the power of the pilot signal can be higher than the power of the wireless sections between central unit and microphone units. Due to the higher level of power of the pilot signal on the pilot channel in comparison with a power of the wireless audio transmission between the microphone units and the central units external units such as for example the WSD 1000 can detect the presence of a wireless audio transmission between the central unit and the microphone units. If the wireless transmission system acquires knowledge by the pilot signal on the pilot channel of the wireless audio transmission paths between the central unit and the microphone units, then that system can take account of the frequency occupancy through the wireless audio transmission paths in its own frequency selection. In that way such an external system can react in an improved fashion to the presence of the wireless audio transmission paths. If the external system is in a position to extract the items of information from the pilot channel, then it can acquire detailed knowledge of the wireless audio transmission paths between the central unit and the microphone unit. It can then take account of that detailed knowledge in the corresponding frequency selection. Optionally access to the pilot channel and a feed-in of items of information can be allowed to the external system in order to permit all participants detailed knowledge of the I-IF transmission environment.

Optionally there can be provided a central unit which serves only for frequency scanning. Such a central unit can however be capable of transmitting items of information based on the frequency scan on the pilot channel. In that way for example it is possible to permit relaying of items of information. That is advantageous as the range of the pilot channel can thus be improved.

Preferably the pilot channel is of such a configuration with the pilot signal that it can be detected, received and decoded by central units. To simplify the communication by way of the pilot channel it is possible for example to associate previously established frequencies and transmission parameters or properties with the pilot channel. The pilot channel can be transmitted for example in an ISM band.

The pilot channel can for example use duplex gaps (for example E-GSM duplex gaps). Those duplex gaps can admittedly be used for the pilot channel, but they are not attractive for use in wireless audio transmission paths. Optionally the transmission characteristics of the pilot channel can be matched to the requirements of data transmission in a duplex gap.

Alternatively it is possible to fall back on the transmission paths in accordance with IEEE 802.22.1. This proposes emitting a radio beacon in the channel center. That radio beacon can be replaced according to the invention by the pilot channel. That is advantageous as the pilot channel can transmit more items of information in respect of the wireless transmission paths.

It is possible to fall back on the pilot channel from one or more central units in time, frequency or code multiplex (TDMA, FDMA or OFDMA, CDMA). Optionally the pilot channel can be operated at a higher power level than the wireless transmission paths between microphone units and central unit. Preferably the pilot channel should not be present in the same channel or band as the wireless transmission paths.

According to the invention the intelligence of the system or the most important items of information are integrated into the pilot tone signal on the pilot channel.

The transmission system or method according to the invention can be used for example in a wireless microphone system, for example on stage. Alternatively the audio transmission system according to the invention can also be used independently of wireless microphones.

Figure 2:
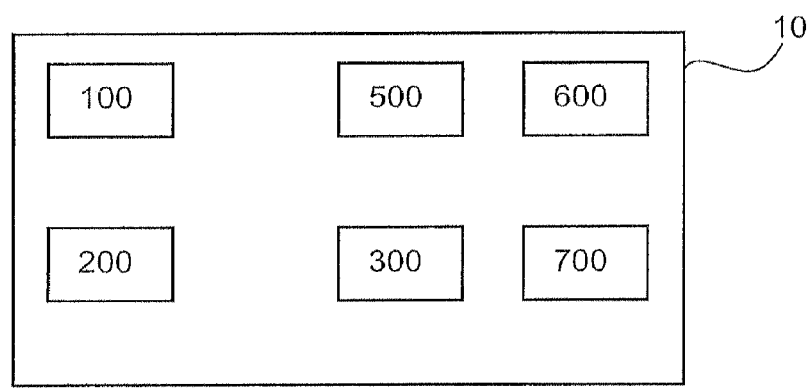
FIG. 2 shows a diagrammatic view of a central unit of a wireless audio transmission system as shown FIG. 1.

FIG. 2 shows a diagrammatic view of a central unit of the audio transmission system of FIG. 1. The microphone units 400 record audio signals or detect audio signals and perform wireless audio transmission to the central unit. The central unit can have a monitor unit 100 for monitoring the wireless transmitting/receiving environment, a wireless receiving unit 500 for receiving the audio signals wirelessly transmitted from the microphone units 400, a pilot tone transmitting unit 600, a position information unit 300 and a pilot signal receiving unit 700 for receiving a pilot tone signal for example on a pilot channel. Optionally there can be a link adaption unit 200 for adapting a wireless transmission link.

The monitor unit 100 serves to implement an analysis of the environment of the central unit for example in respect of frequency occupancy, the presence of interference sources in a frequency band, the band width of the available channels and the like. The monitor unit can also be adapted to perform an analysis of the received signals from the microphone units 400 and the parameters or settings of the audio transmission from the microphone units 400.

The optional link adaption unit 200 can serve to optionally perform adaptation of the transmission channel or the parameters or settings of the transmission from the microphone units, in dependence on the items of information acquired by the monitor unit 100. The receiving unit 500 serves to receive the audio signals transmitted from the microphone units 400.

The position information unit 300 can serve to perform position determination, by means of which a search is made in a database for local frequency occupancies. That information serves for currently prevailing frequency selection.

The pilot tone transmitting unit 600 is adapted to transmit a pilot tone on a pilot channel. That pilot tone or pilot tone signal has a plurality of items of information in respect of the wireless audio transmission environment. Thus the pilot tone signal may have for example manufacturer metadata (manufacturer, type, hardware/software, devices ID), operator metadata (contact data, location), frequency occupancy, a duration of the occupancy and properties of the signal, a frequency occupancy and properties of detected foreign systems and control instructions such as for example frequency allocation and a selection of operating modes. The above-described pilot signal can be transmitted by way of the pilot channel by means of the pilot tone transmitting unit.

The pilot signal receiving unit 700 serves for receiving and processing foreign or external pilot signals (for example from other central units).

In a second embodiment which can be based for example on the first embodiment the central unit 400 can firstly detect for example by means of the receiving unit 500, whether there is a further central unit 41 in the proximity and communicates a pilot tone signal by way of a pilot channel. If the central unit does not detect a pilot tone signal by way of the pilot channel the central unit will communicate its own pilot tone signal by way of the pilot channel. The pilot tone signal has items of information in respect of the wireless transmission path between the central unit and the microphone units. Preferably the pilot tone transmitting unit 600 does not represent a PMSE device and can thus transmit at a higher power level so that the pilot channel can be detected over a greater distance than the wireless microphone units or the wireless audio transmission units in accordance with the first embodiment.

Preferably items of information in respect of the wireless transmission path of the transmitters and receivers are transmitted in the pilot channel by the pilot tone signal. Thus the pilot channel can serve as a return channel between the wireless transmission unit and the central unit.

The items of information on the pilot channel can be transmitted for example in a time slot method so that the pilot channel can also be used by other central units and optionally WSD units. That affords the possibility that items of information can be transmitted and optionally exchanged between various central units and/or WSD units through the pilot channel.

The frequency used for the pilot channel can be adapted to the audio transmission environment and the free frequencies. Preferably however a selection of suitable frequencies should be established beforehand.

Information in respect of the duration of use and/or the amount of data can also be transmitted in the pilot channel to permit suitable billing.

Consensual and coordinated dynamic distribution of locally present channel resources can be made possible by the provision of the above-described pilot channel. In that case it is possible to take account of interference sources which do not participate in the consensual distribution. If a plurality of systems or cells are combined together then it is possible on the basis of the measured occupancy density of the transmission medium to predict which channels are to be used and when to permit interference-free wireless audio transmission.

An audio transmission system according to the invention can be combined with audio transmission systems according to the state of the art as in the first step static frequency occupancy can be effected, which is communicated to other systems by way of the pilot signal. To start with the medium is scanned by means of the monitor unit 100 and a search is made for free frequency channels. When a foreign pilot signal has been detected the information thereof also goes into the monitor unit 100.

According to the invention the above-described microphone unit can have a pilot tone receiving unit for receiving a pilot tone. The information contained in the pilot tone signal can be used for setting a transmitting unit of the microphone.

In a further embodiment of the invention the audio transmission unit or microphone unit can also be in the form of a pocket transmitter. The pocket transmitter has an input for an (external) microphone. The pocket transmitter serves for transmission of the audio signals captured by the microphone.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A wireless audio transmission system for wireless audio transmission comprising:
   at least one wireless microphone unit for detecting audio signals and for wirelessly transmitting the detected audio signals over a first channel which is an audio channel; and
   a central unit comprising:
      a wireless receiver unit for receiving, over the first channel, the wirelessly transmitted audio signals from the at least one wireless microphone unit;
      a pilot tone transmitter for transmitting a first pilot tone signal wirelessly over a second channel which is a first pilot channel; and
      a pilot tone receive for wirelessly receiving and processing a second pilot tone signal;
   wherein each pilot tone signal has information with respect to the wireless transmission between the at least one microphone unit and the central unit;
   wherein the at least one wireless microphone unit is adapted to wirelessly receive the first pilot tone signal and to extract information in the first pilot tone signal;
   wherein the at least one wireless microphone unit is adapted to adjust its operation based on the information extracted from the first pilot tone signal; and
   wherein the wireless audio transmission system is a program making special events (PMSE) system.

2. The wireless audio transmission system as set forth in claim 1;
   wherein a power of each pilot tone signal on the second channel is higher than a power of the wireless audio transmission over the first channel between the at least one microphone unit and the central unit.

3. The wireless audio transmission system as set forth in claim 1;
   wherein transmission of each pilot tone signal is effected in time multiplex, frequency multiplex, or code multiplex.

4. The wireless audio transmission system as set forth in claim 1;
   wherein the central unit is configured to detect whether a pilot channel is already present when the central unit is brought into operation;
   wherein, when the central unit detects that a pilot channel is already present, the central unit accesses the pilot channel by means of the pilot tone receiver and processes the information of the second pilot tone signal; and wherein, when the central unit does not detect that a pilot channel is already present, the central unit is configured to produce a pilot tone signal by means of the pilot tone transmitter.

5. A wireless audio transmission system comprising:
at least one wireless transmission unit for wirelessly transmitting audio signals; and
a central unit having:
   a wireless receiver unit for receiving the wirelessly transmitted audio signals from the wireless transmitting units;
   a pilot tone transmitter for transmitting a first pilot tone signal wirelessly on a pilot channel;
   a plot tone receiver for wirelessly receiving and processing a second pilot tone signal;
wherein each pilot tone signal has information with respect to the wireless transmission between the at least one transmission unit and the central unit;
wherein the at least one wireless transmission unit is adapted to wirelessly receive the first pilot tone signal and to extract information in the first pilot tone signal;
wherein the at least one wireless transmission unit is adapted to adjust its operation based on the information extracted from the first pilot tone signal;
wherein the wireless audio transmission system is a program making special events (PMSE) system.

6. A method of wireless audio transmission in a microphone system having at least one wireless microphone unit and a central unit, the method comprising:
   detecting audio signals and wirelessly transmitting the detected audio signals over a first channel which is an audio channel;
   receiving, over the first channel, the wirelessly transmitted audio signals;
   transmitting a first pilot tone signal wirelessly over a second channel which is a first pilot tone channel; and
   wirelessly receiving and processing a second pilot tone signal when the second pilot tone signal is present;
   wherein each pilot tone signal has information with respect to the wireless transmission between the at least one microphone and the central unit; and wherein the method further comprises:
   wirelessly receiving the first pilot tone signal and extracting information from the first pilot tone signal; and
   adjusting operation of the at least one wireless microphone unit based on the information extracted from the first pilot tone signal; and
wherein the microphone system is a program making special events (PMSE) system.

7. The wireless audio transmission system as set forth in claim 2;
   wherein the central unit is configured to detect whether a pilot channel is already present when the central unit is brought into operation;
   wherein, when the central unit detects that a pilot channel is already present, the central unit accesses the pilot channel by means of the pilot tone receiver and processes the information of the second pilot tone signal; and
   wherein, when the central unit does not detect that a pilot channel is already present, the central unit is configured to produce a pilot tone signal by means of the pilot tone transmitter.

8. The wireless audio transmission system as set forth in claim 3;
   wherein the central unit is configured to detect whether a pilot channel is already present when the central unit is brought into operation;
   wherein, when the central unit detects that a pilot channel is already present, the central unit accesses the pilot channel by means of the pilot tone receiver and processes the information of the second pilot tone signal; and
   wherein, when the central unit does not detect that a pilot channel is already present, the central unit is configured to produce a pilot tone signal by means of the pilot tone transmitter.

* * * * *